United States Patent Office 3,625,032
Patented Dec. 7, 1971

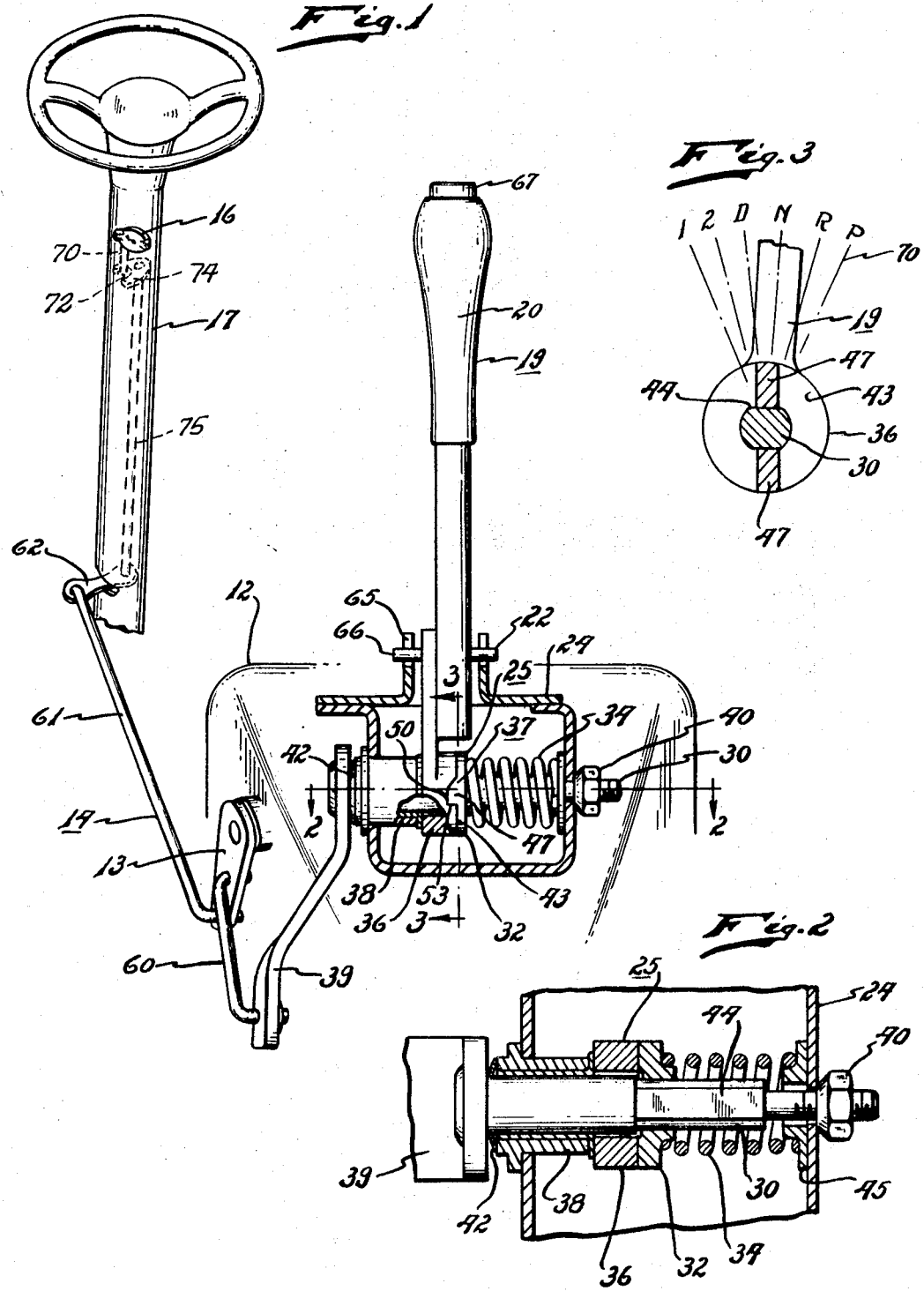

3,625,032
COUPLING MECHANISM FOR TRANSMISSION
SHIFT SELECTOR HAND LEVER
Earl M. Muhleck, Detroit, Mich., assignor to American
Motors Corporation, Kenosha, Wis.
Filed Mar. 19, 1970, Ser. No. 20,978
Int. Cl. B60r 25/06; G05g 5/06
U.S. Cl. 70—202
1 Claim

ABSTRACT OF THE DISCLOSURE

A coupling arrangement interposed between a shift selector hand lever and its connection with a vehicle's drive transmission and a key locking mechanism, the latter being operable to immobilize the shift selector hand lever which when subjected to forcement initiates a camming action in the coupling arrangement to release to free in idle movement the hand lever.

BACKGROUND OF THE INVENTION

Field of the invention

This invention pertains to a coupling mechanism interrelating a shift control hand lever with a drive transmission and the vehicle's anti-theft key locking arrangement.

Description of the prior art

In arranging anti-theft locking devices in an automotive vehicle the preferred practice is to provide a single key locking mechanism to function to control the lockment of the ignition system, the steering apparatus and transmission or gearbox. Generally, the shift selector hand lever is positioned a remote distance from the transmission to require a suitable arrangement of interconnectors, such as links, rods, cables and the like, which are also extended to and integrated into the locking system. The lockment of the transmission is thus effected by immobilizing the interconnecting elements and thereby the shift selector hand lever. A person seeking to circumvent the transmission lockment generally subjects the immobilized handle to a forcement. The application of sufficient or undue force may cause one or more of the connector elements to break, bend or become unduly stretched. A foreshortening by bending, stretching, or a combination of both in one or more elements may be sufficient to force a limited shifting of the transmission from its pre-set non-drive to a drive position. It is to eliminate this circumventing of the locking arrangement and damage to the control mechanism that the present invention is directed.

SUMMARY OF THE INVENTION

It is an object of the present invention to provide an automatic coupling or uncoupling arrangement for a shift selector hand lever with a transmission and locking mechanism.

Another object of the present invention is to provide a release arrangement for a shift selector hand lever with a transmission and a locking mechanism by a spring tensioned clutch arrangement with a camming arrangement, the latter adapted upon lockment of the hand lever to utilize the forcement of the hand lever to actuate the clutch arrangement and release the hand lever from its operative connection into free idle movement.

A still further object of the present invention is to provide a coupling arrangement which is simple in structure, highly efficient in use and economical of manufacture.

BRIEF DESCRIPTION OF THE DRAWINGS

FIG. 1 is a vertical sectional view of the present invention in a diagrammatic illustration with a steering column and transmission in a motor vehicle coordinated with a key locking arrangement;

FIG. 2 is an enlarged cross sectional view taken along line 2—2 of FIG. 1; and

FIG. 3 is an enlarged fragmentary view taken along line 3—3 of FIG. 1 with a graphic illustration of the movements of the shift selector hand lever.

DESCRIPTION OF THE PREFERRED
EMBODIMENT

With reference to the drawing, shown is a motor vehicle transmission or gearbox 12 having a control arm 13 operatively interconnected by a suitable arrangement of connectors forming a linkage assembly, indicated in general by a numeral 14, with a key operated locking mechanism 16 and a shift selector assembly, indicated in general by a numeral 19. The locking mechanism 16 is shown mounted on a steering column 17 in the motor vehicle with the shift selector assembly 19 remoted to another area of the vehicle, each being accessible to the operator of the vehicle. A practice is to mount the assembly 19 on the floor of the vehicle enclosed in a console (not shown). On a floor mounting, the assembly 19 will also be in remote relationship with the transmission as shown in the drawing. It will be obvious that the assembly 19 and the locking mechanism 16 may, if desired, be mounted in any other convenient area of the vehicle accessible to the operator.

The assembly 19 comprises a shift selector hand lever 20, a device 22 for lockment of the hand lever 20 as it is selectively adjusted to a select position in control setting the transmission, and a housing 24 enclosing my coupling arrangement, indicated in general by a numeral 25.

The coupling arrangement 25 comprises a rotatable shaft 30, a clutch plate 32 urged by a compression spring 34 into frictional engagement with hub 36 of the shift selector hand lever 20, and a camming arrangement, indicated in general by a numeral 37.

The shaft 30 is journaled in a bearing 38 suitably supported by the housing 24. The terminal ends of the shaft 30 extend externally of the housing projecting through respective openings. An arm 39 is fixedly secured to one terminal end of the shaft 30 for rotation therewith, on the other terminal end is threadably received a nut 40. The threadable adjustment of the nut 40 against an adjacent wall of the housing 24 cooperatively provides with a resilient washer 42, positioned on the shaft 30 between the arm 39 and bearing 37, an adjustment to minimize axial movement as well as rotational binding of the shaft 30.

The hub 36 is axially received on the shaft 30 which serves as an axis pin in the pivotal movement of the hand lever. The hub is axially located on the shaft having one face resting against an adjacent end of the bearing 38 and the other face 43 being functionally engaged by the clutch plate 32. The clutch plate is axially moveable on the shaft and continually locked in rotational drive with the shaft 30 by flat chorded portions engaging opposed flat portions 44 on the shaft 30.

The spring 34 is coaxially mounted on the shaft 30 in compression between the clutch plate 32 and a reaction disk or collar 45. The collar 45 is shown in abutment against a wall of the housing 24, however it will be readily apparent that the collar may be selectively secured (not shown) along the shaft in any well known manner to vary the tension of the spring as is necessary.

In addition to the hub being frictionally interlocked in drive with the clutch plate, the camming arrangement 37 provides an additional drive interlockment when the hand lever 20 is pivotally moved in a clockwise direction, see FIG. 3, wherein the radial lines with indicia, indicated by numeral 70, denotes the various progressive positions for the hand lever and accordingly the drive adjustments of the transmission. Setting the hand lever in the extreme right position, designated by the letter P, presets the transmission in nondrive. Pivoting the hand lever counterclockwise frictionally interlocks the spring tensioned clutch plate in drive in shifting into drive the transmission. In the event the spring 34 is overcome the hand lever is freed from its frictional engagement and placed in idle movement, as will be more fully explained.

The camming arrangement 37 comprises followers 47 formed integrally with the clutch plate 32 and cam surfaces 50 recessed from the face 43 of the hub 36. Each cam surface 50 is engaged by a respective follower 47 and preferably, as shown in the drawing, they are complementary in contour to each other in an interfit below the face 43 so as to interfere with the frictional engagement of the clutch plate thereagainst. Each recessed cam is formed with a shoulder abutment 53 adapted to abut against an opposed abutment on the follower 47 for unilateral rotational carry of the clutch plate by the hand lever as it is pivoted towards the extreme right position P. From the shoulder 53 the cam surfaces are each contoured outwardly towards and meeting the face surface 43.

The linkage assembly 14 includes a rod 60 operatively interconnecting the arm 39 to arm 13 of the transmission, the arm 13 in turn is connected by a rod 61 to an arm 62 related with and controlled by the key operated locking mechanism 16. The arrangement of arm 62 with the locking mechanism forms no particular part of the present invention and any well known arrangement may be used to sequentially lock immobile the arm 62 and accordingly the shift selector hand lever 20, or unlock the arm 62 to be in idle movement during operative control of the transmission by the hand lever 20. A known arrangement is shown in FIG. 1 and comprises a detent 70 operable by the lock mechanism 16 to be moved into and out of an opening or recess 72 formed in a segment 74 fixedly secured to one end of a shaft 75 whose opposite end is also fixedly secured to the arm 62 for movement therewith.

The hand lever 20 is sequentially moveable through the control positions, indicated by numeral 70, as shown in FIG. 3, and is secured in the selected position by the positioning device 22 which may be a quadrant with sequentially spaced recesses 65 adapted to receive a detent 66 operable through manual actuation of a button 67, or the like, carried on the hand lever.

The clutch plate 32 is normally held in continual engagement with the hand lever 20 and the movement of the hand lever drives in like rotation the clutch plate. The rotation of the clutch plate is translated through shaft 30, arm 39, rod 60 to swing arm 13 to preset the transmission operationally and accordingly to the selected position of the hand lever 20.

Prior to key lockment, the hand lever 20 is preset into the extreme right position P which takes the transmission out of drive. In swinging to this position the clutch plate is further locked in movement with the hand lever by the engagement of the shoulder 53 of the hub against follower 44 which insures that the transmission will be accordingly preset out of drive and the arm 62 preset for lockment by the key operated locking mechanism 16 which on manual movement will move the detent 70 into engagement with the segment 74. In lockment the arm 62, the linkage assembly 14, arm 13, shaft 30 and hand lever 20 are all immobilized. The hand lever is however immobilized to the extent to resist normal manual force approximating that required for normal shifting. An undue forcement to pivot the locked hand lever will overcome the compression spring to force the clutch plate 32, being held against rotation by the locked shaft 30, to be moved axially or laterally out of engagement with the hub as the followers 44 ride a respective rotating cam surface 50. The camming arrangement prevents a re-coupling of the hand lever while being idly moved except upon a return to the original position where the uncoupling had been effected. Upon return to the original position the coupling is automatic as the followers re-enter respective recesses allowing the spring to urge the clutch plate into engagement with the hand lever.

Having thus described the invention, it will be apparent to those skilled in the art that various modifications and changes can be made without departing from the spirit of the invention or the scope of the appended claim.

I claim:

1. In a motor vehicle having a drive transmission, a shift selector hand lever and a key operated locking mechanism interconnected operatively with each other by an arrangement of interconnectors for operational control of said drive transmission, said key locking mechanism being operable to alternately preset operable and inoperable said arrangement of interconnectors, means operatively connecting and selectively releasing said shift control hand lever with or from said arrangement of interconnectors, said means comprising;

a first and second member telescopically coupled in drive connection, said first member in drive connection with said arrangement of interconnectors and said second member alternately moveable in and out of drive engagement with said shift selector handle;

said shift selector hand lever being moveable in a limited range in a first and a second direction;

resilient means urging said second member in drive engagement with said shift selector hand lever;

releasing means associated with said shift selector hand lever and second member and being responsive upon initiating from a preset position movement of said hand lever in a first direction to disengage thereby the drive engagement therebetween when the drive of said second member with said first member is being held inoperable by and with said arrangement of interconnectors; and said releasing means including an interlock being incapable to effect disengagement of said shift selector hand lever with said second member when said hand lever is being moved in said second directions.

References Cited

UNITED STATES PATENTS

| 3,515,012 | 6/1970 | Adahan | 74—473 |
| 1,740,096 | 12/1929 | Johnson | 70—245 |
| 2,339,980 | 1/1944 | Cloutier | 70—422 XR |
| 1,565,754 | 12/1925 | Orth | 64—29 |
| 1,611,940 | 12/1926 | Ohmer | 64—29 |
| 2,291,407 | 7/1942 | Paul | 64—29 |

ALBERT G. CRAIG, Jr., Primary Examiner

U.S. Cl. X.R.

64—29; 70—204, 422; 74—473